(12) United States Patent
Lo

(10) Patent No.: US 11,562,201 B2
(45) Date of Patent: Jan. 24, 2023

(54) NEURAL NETWORK LAYER PROCESSING WITH NORMALIZATION AND TRANSFORMATION OF DATA

(71) Applicant: Microsoft Technology Licensing, LLC, Redmond, WA (US)

(72) Inventor: Daniel Lo, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1005 days.

(21) Appl. No.: 16/284,445

(22) Filed: Feb. 25, 2019

(65) Prior Publication Data

US 2020/0272882 A1 Aug. 27, 2020

(51) Int. Cl.
| | |
|---|---|
| *G06N 3/00* | (2006.01) |
| *G06N 3/04* | (2006.01) |
| *G06F 5/01* | (2006.01) |
| *G06N 3/08* | (2006.01) |

(52) U.S. Cl.
CPC ............... *G06N 3/04* (2013.01); *G06F 5/012* (2013.01); *G06N 3/08* (2013.01)

(58) Field of Classification Search
None
See application file for complete search history.

(56) References Cited

U.S. PATENT DOCUMENTS

2017/0046616 A1\* 2/2017 Socher ................ G06V 10/82
2017/0286830 A1 10/2017 El-Yaniv et al.

FOREIGN PATENT DOCUMENTS

WO 2018148526 A1 8/2018

OTHER PUBLICATIONS

Ioffe, et al., "Batch Normalization: Accelerating Deep Network Training by Reducing Internal Covariate Shift", In Repository of arXiv:1502.03167v1, Feb. 11, 2015, 10 Pages.
"International Search Report and Written Opinion Issued in PCT Application No. PCT/US20/017802", dated May 29, 2020, 11 Pages.

\* cited by examiner

*Primary Examiner* — Martin Mushambo
(74) *Attorney, Agent, or Firm* — Ranjeev Singh; Singh Law, PLLC

(57) ABSTRACT

Processors and methods for neural network processing are provided. A method includes receiving a subset of data corresponding to a layer of a neural network for processing using the processor. The method further includes during a forward propagation pass: (1) normalizing the subset of the data corresponding to the layer of the neural network based on an average associated with the subset of the data and a variance associated with the subset of the data, where the normalizing the subset of the data comprises dynamically updating the average and dynamically updating the variance, to generate normalized data and (2) applying a transformation to the normalized data using a fixed scale parameter corresponding to the subset of the data and a fixed shift parameter corresponding to the subset of the data such that during the forward propagation pass neither the fixed scale parameter nor the fixed shift parameter is updated.

20 Claims, 5 Drawing Sheets

NEURAL NETWORK LAYER PROCESSING WITH NORMALIZATION AND TRANSFORMATION OF DATA

BACKGROUND

Neural network technology is used to perform complex tasks such as image classification, reading comprehension, language translation, or speech recognition. Many of these tasks include deep learning that involves performing large numbers of floating point matrix multiply and accumulate operations. These operations are performed during training as well as during serving of results based on the input data and the trained data.

Neural networks may use values corresponding to the input data and the training data expressed in different formats, including data expressed in different levels of precision.

SUMMARY

In one example, the present disclosure relates to a method implemented by a processor. The method may include receiving a subset of data corresponding to at least one layer of a neural network for processing using the processor. The method may further include during a forward propagation pass: (1) normalizing the subset of the data corresponding to the at least one layer of the neural network based on an average associated with the subset of the data and a variance associated with the subset of the data, where the normalizing the subset of the data comprises dynamically updating the average and dynamically updating the variance, to generate normalized data and (2) applying a transformation to the normalized data using a fixed scale parameter corresponding to the subset of the data and a fixed shift parameter corresponding to the subset of the data such that during the forward propagation pass neither the fixed scale parameter nor the fixed shift parameter is updated.

In another example, the present disclosure relates to a processor configured to receive a subset of data corresponding to at least one layer of a neural network. The processor may further be configured to during a forward propagation pass: (1) normalize the subset of the data corresponding to the at least one layer of the neural network based on an average associated with the data and a variance associated with the data, wherein to normalize the subset of the data the processor is further configured to dynamically update the average and dynamically update the variance, to generate normalized data and (2) apply a transformation to the normalized data using a fixed scale parameter corresponding to the subset of the data and a fixed shift parameter corresponding to the subset of the data such that during the forward propagation pass neither the fixed scale parameter nor the fixed shift parameter is updated.

In yet another example, the present disclosure relates to a non-transitory computer-readable medium comprising instructions corresponding to a method implemented by a processor. The method may include receiving a subset of data corresponding to at least one layer of a neural network for processing using the processor. The method may further include during a forward propagation pass: (1) normalizing the subset of the data corresponding to the at least one layer of the neural network based on an average associated with the subset of the data and a variance associated with the subset of the data, where the normalizing the subset of the data comprises dynamically updating the average and dynamically updating the variance, to generate normalized data and (2) applying a transformation to the normalized data using a fixed scale parameter corresponding to the subset of the data and a fixed shift parameter corresponding to the subset of the data such that during the forward propagation pass neither the fixed scale parameter nor the fixed shift parameter is updated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
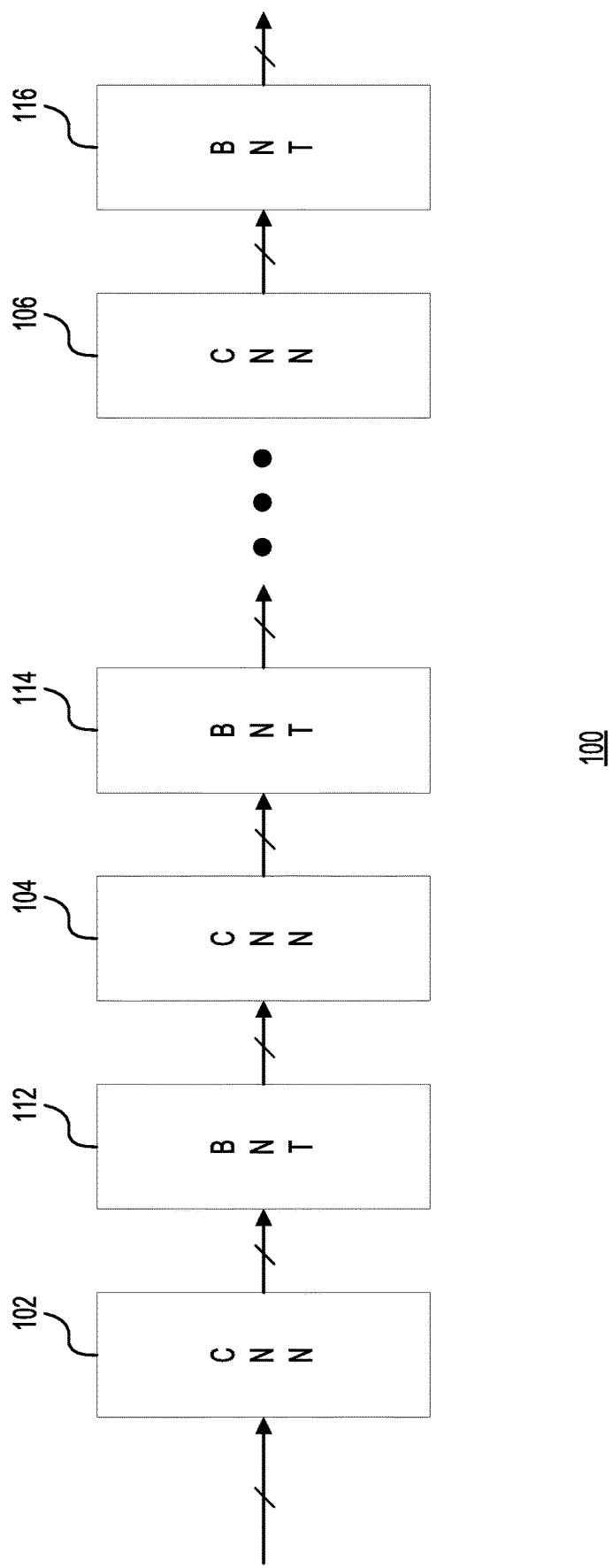
FIG. 1 is a block diagram showing neural network layer processing with batch normalization, including updating the batch normalization parameters, in accordance with one example.

Examples disclosed in the present disclosure relate to using system, methods, and components for implementing neural network based processing. Certain examples relate to processing layers of Convolutional Neural Networks (CNNs), including normalizing data corresponding to at least one of the CNN layers and improving the network accuracy through only updating the batch normalization parameters. Certain examples relate to processing layers of CNNs using a neural network processor. A neural network processor may be implemented using any of Field Programmable Gate Arrays (FPGAs), Application Specific Integrated Circuits (ASICs), Erasable and/or Complex programmable logic devices (PLDs), Programmable Array Logic (PAL) devices, and Generic Array Logic (GAL) devices. Neural network processors may also be implemented using a CPU, a GPU, a combination of CPUs and GPUs, or a combination of any of the programmable hardware, CPUs, and GPUs. An image file may be used to configure or re-configure neural network processors such as FPGAs. The image file or similar file or program may be delivered via a network link or a local link (e.g., PCIe) from a host CPU. Information included in an image file can be used to program hardware blocks of a processor (e.g., logic blocks and reconfigurable interconnects of an FPGA) to implement desired functionality. Desired functionality can be implemented to support any service that can be offered via a combination of computing, networking, and storage resources, such as via a data center or other infrastructure for delivering a service.

The described aspects can also be implemented in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

Machine learning services, such as those based on Recurrent Neural Networks (RNNs), Long Short Term Memory (LSTM) neural networks, or Gated Recurrent Units (GRUs) may be implemented using the systems and processors described in this disclosure. In one example, the service-related content or other information such as words, sentences, images, videos, or other such content/information may be translated into a vector representation.

In one example, the neural network model may comprise of many layers and each layer may be encoded as matrices or vectors of weights expressed in the form of coefficients or constants that have been obtained via training of a neural network. GPUs or programmable hardware logic blocks in the neural network processors may process the matrices or vectors to perform various operations, including multiply, add, and other operations against input vectors representing encoded information related to the service.

Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. An LSTM layer may be described using a set of equations, such as the ones below:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} i_t \tan h(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tan h(c_t)$$

In this example, inside each LSTM layer the inputs and hidden states may be processed using a combination of vector operations (e.g., dot-product, inner product, or vector addition) and non-linear functions (e.g., sigmoids, hyperbolic and tangents). In certain cases, the most compute intensive operations may arise from the dot products, which may be implemented using dense matrix-vector and matrix-matrix multiplication routines. In one example, the processing of the vector operations and non-linear functions may be performed in parallel.

Values corresponding to the training data or weights, including vector data, may be represented in a number format. Floating point representation for the values of the data is expensive because each individual point value has an exponent specific to that point value. The alternative may be a fixed point representation. Performance, energy usage, and storage requirements can be improved through the use of reduced precision formats to implement artificial neural networks. Such formats can represent floating point numbers using a small (e.g. 3, 4, or 5-bit) mantissa and an exponent shared by two or more floating point numbers. Neural networks that use reduced precision formats may be referred to as quantized neural networks. Quantization may involve mapping continuous or high precision values onto a discrete, low precision grid.

In one example, fixed point representation may use a set number of integer bits and fractional bits to express numbers. Fixed point can be efficiently processed in hardware with integer arithmetic, which may make it a preferred format when applicable. Fixed point format may be represented as qX.Y, where X is the number of integer bits and Y is the number of fractional bits. Block-floating point (BFP) may apply a shared exponent to a block of fixed point numbers, for example a vector or matrix. The shared exponent may allow a significantly higher dynamic range for the block, although individual block members have a fixed range with respect to each other.

Quantized neural networks can improve the latency and throughput of running neural networks by reducing computation and memory demands. Many neural network approaches typically use full precision floating point (e.g., 32- or 16-bit floating point numbers) number format. As an example, certain software implementations of neural networks may use floating point numbers. On the other hand, certain hardware implementations of neural networks may use reduced precision numbers. Because underlying implementations of the software and hardware-accelerated neural networks are different, small differences in the calculations can arise that can cause errors over time.

In addition, while performing inference operations with a quantized network is extremely fast, quantizing a neural network may impact its task accuracy. This is because using weights trained for a floating-point model with a quantized model often results in significant accuracy loss. One way to improve this accuracy is to run additional epochs of training with the quantized model using stochastic gradient descent (SGD). However, this can be a complex and time-consuming process. Certain examples in the present disclosure relate to fine-tuning batch normalized layers in a quantized model that may advantageously improve model accuracy. In addition, this allows for fine tuning of a trained neural network, without requiring access to the original training data. Thus, a neural network can be fine-tuned by skipping retraining (e.g., skipping stochastic gradient descent) and updating batch normalization parameters of selected layers to achieve a desired standard deviation and mean for the desired layer. This may advantageously improve the network results without a high-overhead retraining.

Moreover, to improve the accuracy of the quantized model, labeled data and the original training scripts may not be required. In some cases, advantageously no training data from the original training set may be required; instead, any representative data set may be adequate. This may allow the use of inference hardware to improve the accuracy of the quantized model without requiring the hardware to perform operations used when training the model (e.g., transpose operations).

FIG. 1 shows a neural network 100 including layers with batch normalization, including updating the batch normalization parameters, in accordance with one example. As part of this example, neural network 100 may include layers 102, 104, and 106. In this example, each of layers 102, 104, and 106 may be convolutional neural network (CNN) layers. The output of layer 102 may be provided as input to a batch normalization and transformation (BNT) block 112. The output of BNT block 112 may be provided as input to layer 104. The output of layer 104 may be provided as input to BNT block 114. Layer 106 may receive its input from a preceding batch normalization block. The output of layer 106 may be provided as input to BNT block 116. Although FIG. 1 shows a neural network 100 with a certain number of layers and BNT blocks coupled to each other in a certain order, neural network model 100 may include additional or fewer layers and additional or fewer BNT blocks that may be arranged differently.

Figure 2:
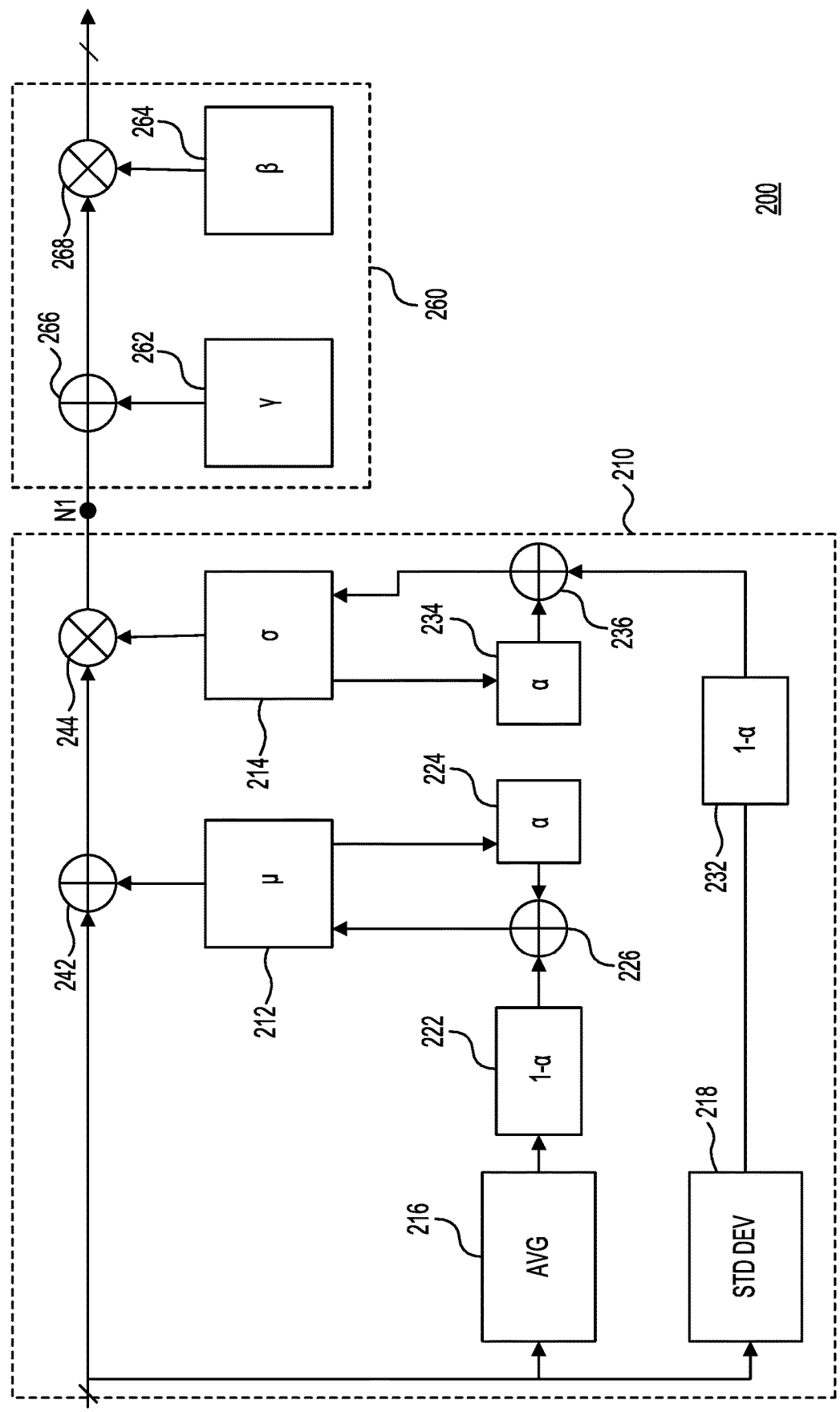
FIG. 2 is a diagram showing an update batch normalization parameters block in accordance with one example.

FIG. 2 is a diagram showing a batch normalization and transformation (BNT) block 200 in accordance with one example. In this example, BNT block 200 may be incorporated as part of any of the BNT blocks described earlier with respect to FIG. 1. The functionality corresponding to BNT block 200 may be implemented using software alone, using hardware alone, or using a combination of hardware and software. In this example, BNT block 200 may include a normalization stage 210 and a transformation stage 260. Each of normalization stage 210 and transformation stage 260 may include several storage and functional sub-blocks. Storage functionality may be implemented using a register, a memory, or another type of storage. In this example, BNT block 200 may receive at least a subset of data (e.g., a mini-batch) from a previous layer of a neural network model. BNT block 200 may include a block 216 to calculate an average value corresponding to the mini-batch. BNT block 200 may further include a block 218 to calculate a measure of the variance, e.g., standard deviation, in the mini-batch.

With continued reference to FIG. 2, normalization may include normalizing the subset of the data based on a normal distribution assumption. As part of training of the neural network, including forward propagation, normalizing may be performed for each mini-batch. For values x over a minibatch: $B=\{x_1, \ldots, x_m\}$, the normalization may be performed as below:

$$\mu_B = \frac{1}{m}\sum_{i=1}^{m} x_i \quad \text{(Equation 1)}$$

$$\sigma_B^2 = \frac{1}{m}\sum_{i=1}^{m}(x_i - \mu_B)^2 \quad \text{(Equation 2)}$$

$$\hat{x}_i = \frac{x_i - \mu_B}{\sqrt{\sigma_B^2 + \epsilon}} \quad \text{(Equation 3)}$$

where $\mu_B$=average or mean for the mini-batch, $\sigma_B^2$=square of the variance for the mini-batch, $\hat{x}_i$=normalized values, and where $\epsilon$ is a small value to prevent numerical instability. In this example, storage 216 may store $\mu_B$ and storage 218 may store a square root of $\sigma_B^2$ as the standard deviation. As part of the processing in normalization stage 210, a scaling factor $\alpha$ may be used to weight the batch average or mean (block 216) versus the running average $\mu$ (block 212). The same scaling factor or another scaling factor may be used to weight the batch variance or standard deviation (block 218) versus the running variance a (block 214). Example values for the scaling factor range from 0.05 to 0.95. Blocks 222, 224, and 226 may be configured to relatively weight the batch average versus the running average $\mu$ based on the scaling factor. Blocks 232, 234, and 236 may be configured to relatively weight the batch variance versus the running variance a. The incoming data (e.g., the mini-batch values) may be normalized using the running average $\mu$ and the running variance $\sigma$ using Equation 3. In this example, blocks 242 (adder) and 244 (multiplier) may be configured to normalize the mini-batch values using the running average $\mu$ and the running variance a. In this manner, in this example, both the running average $\mu$ and the running variance $\sigma$ may be dynamically updated during forward propagation.

Normalization stage 210 may generate normalized data that may then be provided to transformation stage 260.

Still referring to FIG. 2, transformation stage 260 may be configured to provide the functionality associated with applying a transformation to the normalized data. In this example, the transformation may include scaling and shifting the normalized values as per $y_i=\gamma\hat{x}_i+\beta$ (Equation 4). Block 262 may store a fixed value of the scale parameter ($\gamma$) and block 264 may store a fixed value of the shift parameter ($\beta$). During a forward propagation pass, block 266 may scale the normalized data by the value of scale parameter ($\gamma$) and block 268 may scale the normalized data by the value of shift parameter ($\beta$). Neither the shift parameter nor the scale parameter may be updated during the forward propagation pass.

Figure 3:
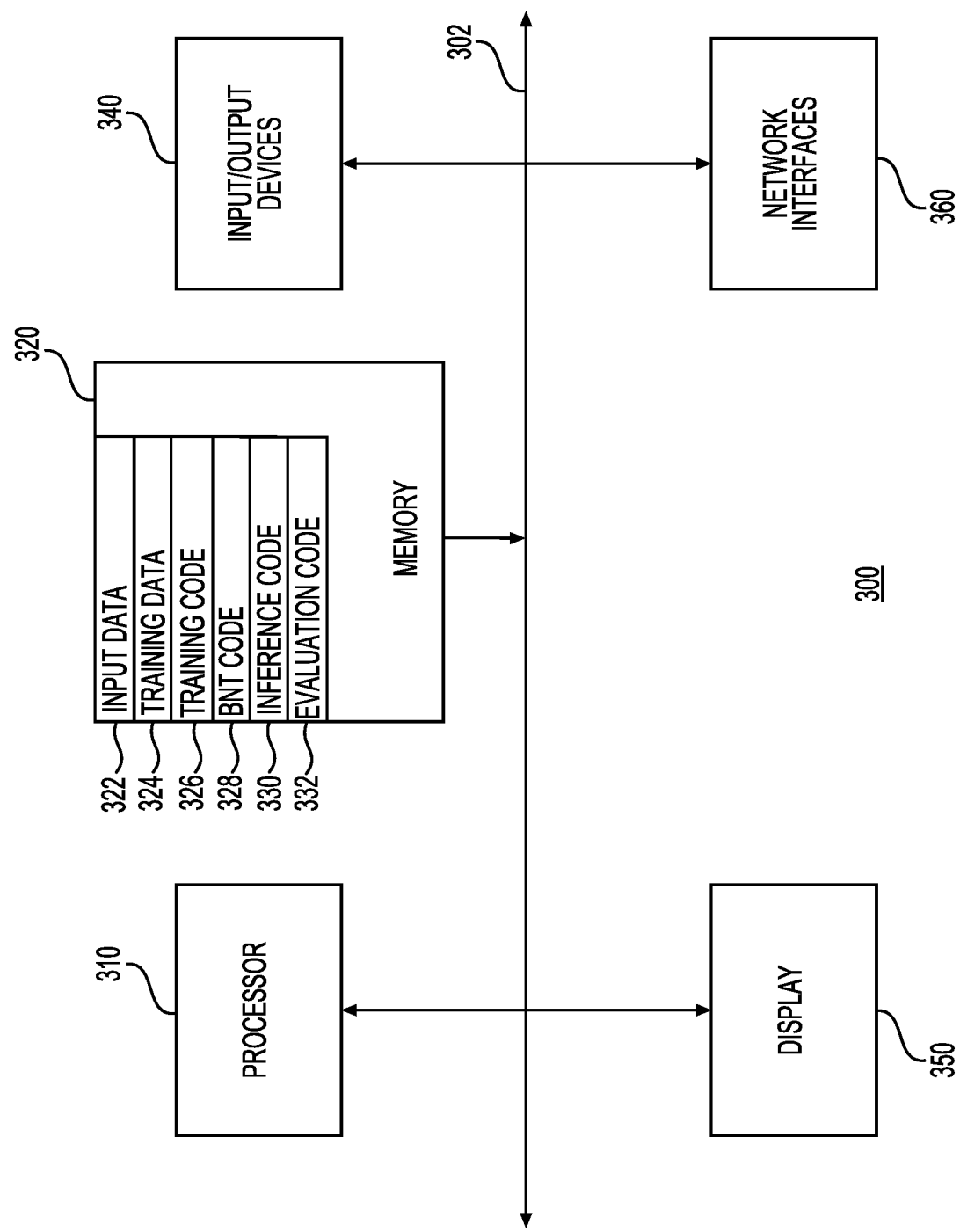
FIG. 3 is a block diagram of a system for updating batch normalization parameters in accordance with one example.

FIG. 3 is a block diagram of a system for updating batch normalization parameters in accordance with one example. System 300 may include a processor 310, a memory 320, input/output devices 340, display 350, and network interfaces 360 interconnected via bus system 302. Memory 320 may include input data 322, training data 324, training code 326, batch normalization and transformation code 328, inference code 330, and evaluation code 332. Input data 322 may comprise data corresponding to images or other types of information that can be classified or otherwise processed using a neural network. As an example, input data 322 may be quantized input data. As explained earlier, quantized input data may include data (e.g., pixels corresponding to an image or a portion of an image) that has been converted from a higher precision format to a lower precision format.

Memory 320 may further include training data 322 that may include weights obtained by training the neural network using the higher precision numbers (e.g., floating point format numbers). Memory 320 may further include training code 326 comprising instructions configured to train a neural network, such as ResNet-50. Training code 326 may use the weights obtained by training the neural network using the higher precision numbers (e.g., floating point format numbers). Memory 320 may further include a batch normalization and transformation code 328 comprising instructions configured to perform batch normalization on a mini-batch and to transform the data. In one example, batch normalization and transformation code 328 may perform the functions described earlier with respect to FIG. 1 and FIG. 2. As explained earlier, these functions may be performed to increase the accuracy of the neural network model that has been quantized, but is using weights trained for a floating-point model (e.g., stochastic gradient descent (SGD) based training).

With continued reference to FIG. 3, memory 320 may further include inference code 330 comprising instructions to perform inference using a trained neural network. Memory 320 may further include evaluation code 332 comprising instructions to evaluate the performance of the trained neural network in terms of the accuracy of inference. Although FIG. 3 shows a certain number of components of system 300 arranged in a certain way, additional or fewer components arranged differently may also be used. In addition, although memory 320 shows certain blocks of code, the functionality provided by this code may be combined or distributed. In addition, the various blocks of code may be stored in non-transitory computer-readable media, such as non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media.

Figure 4:
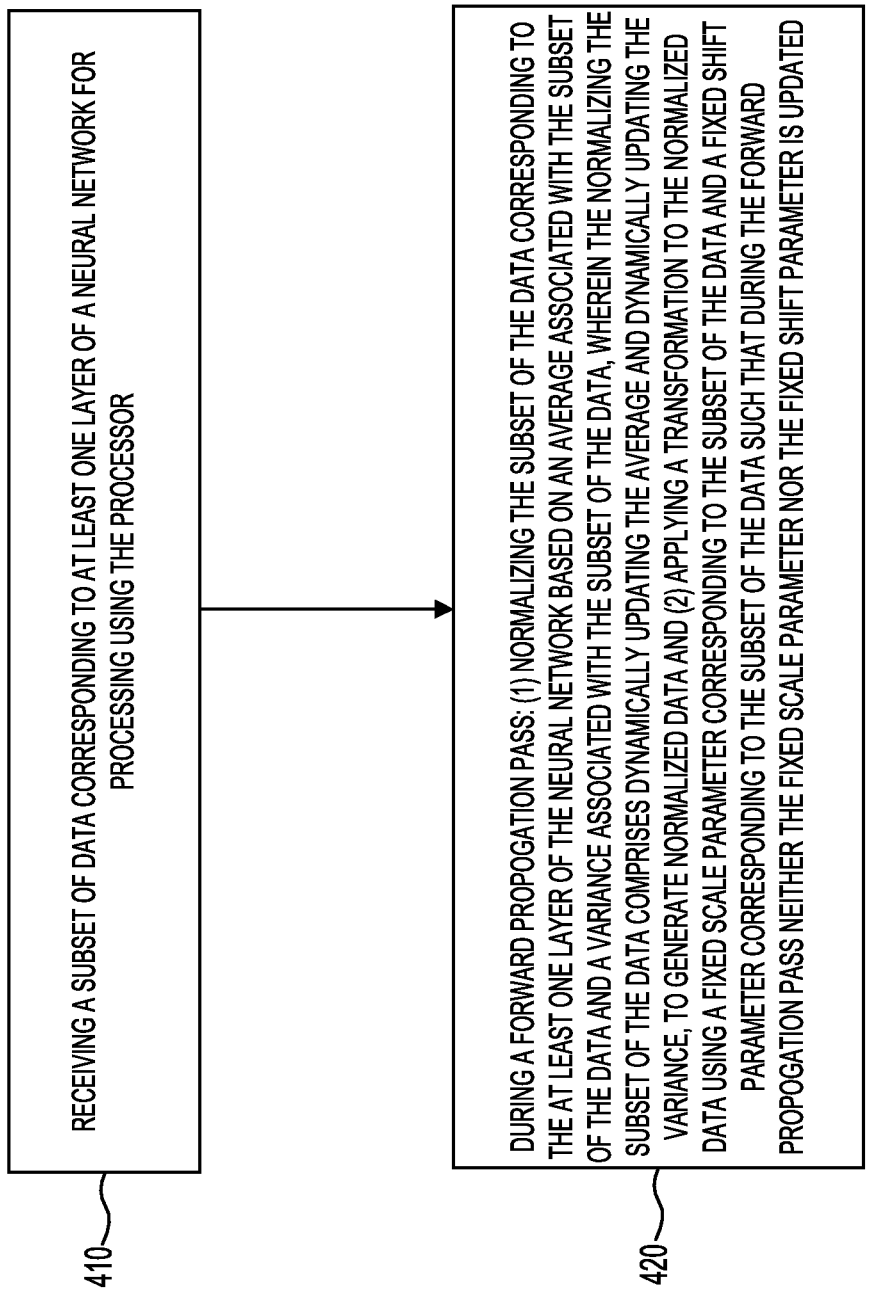
FIG. 4 shows a flow diagram of a method in accordance with one example.

FIG. 4 is a flow chart 400 of a method in accordance with one example. The method may be implemented by processor 310 of FIG. 3. Step 410 may include receiving a subset of data corresponding to at least one layer of a neural network for processing using the processor. Prior to this step, another step may include memory 320 receiving input data 322 via another storage or via a network and storing as part of input data 322.

Step 420 may include during a forward propagation pass: (1) normalizing the subset of the data corresponding to the at least one layer of the neural network based on an average associated with the subset of the data and a variance associated with the subset of the data, where the normalizing the subset of the data comprises dynamically updating the average and dynamically updating the variance, to generate normalized data and (2) applying a transformation to the normalized data using a fixed scale parameter corresponding to the subset of the data and a fixed shift parameter corresponding to the subset of the data such that during the forward propagation pass neither the fixed scale parameter nor the fixed shift parameter is updated. In this example, as part of this step normalizing the subset of the data may include using processor 310 of FIG. 3 to execute instructions configured to provide the functionality associated with Equations 1, 2, and 3 discussed earlier with respect to FIG. 2. Thus, normalization may include normalizing the subset of the data based on a normal distribution assumption. As part of training of the neural network, including forward propagation, normalizing may be performed for each subset of the data (e.g., a mini-batch). The transformation step may include using processor 310 to execute instructions configured to provide the functionality associated with Equation 4 discussed earlier with respect to FIG. 2. Step 420 may be repeated until the moving average (e.g., the dynamically updated average) and the moving variance (e.g., the dynamically updated variance) have settled (e.g., moving average is 0 and moving variance is 1) or until a predetermined timeout has been reached. Thus, after normalization, the moving average should be 0 and the moving variance should be 1, but the average and variance of the data before normalization are different. Although FIG. 4 shows a certain number of steps performed in a certain order, the method may include additional steps performed in a different order. The functionality associated with the method of FIG. 4 may also be included in a neural network processor, such that most of the functionality may be provided in hardware or firmware.

Figure 5:
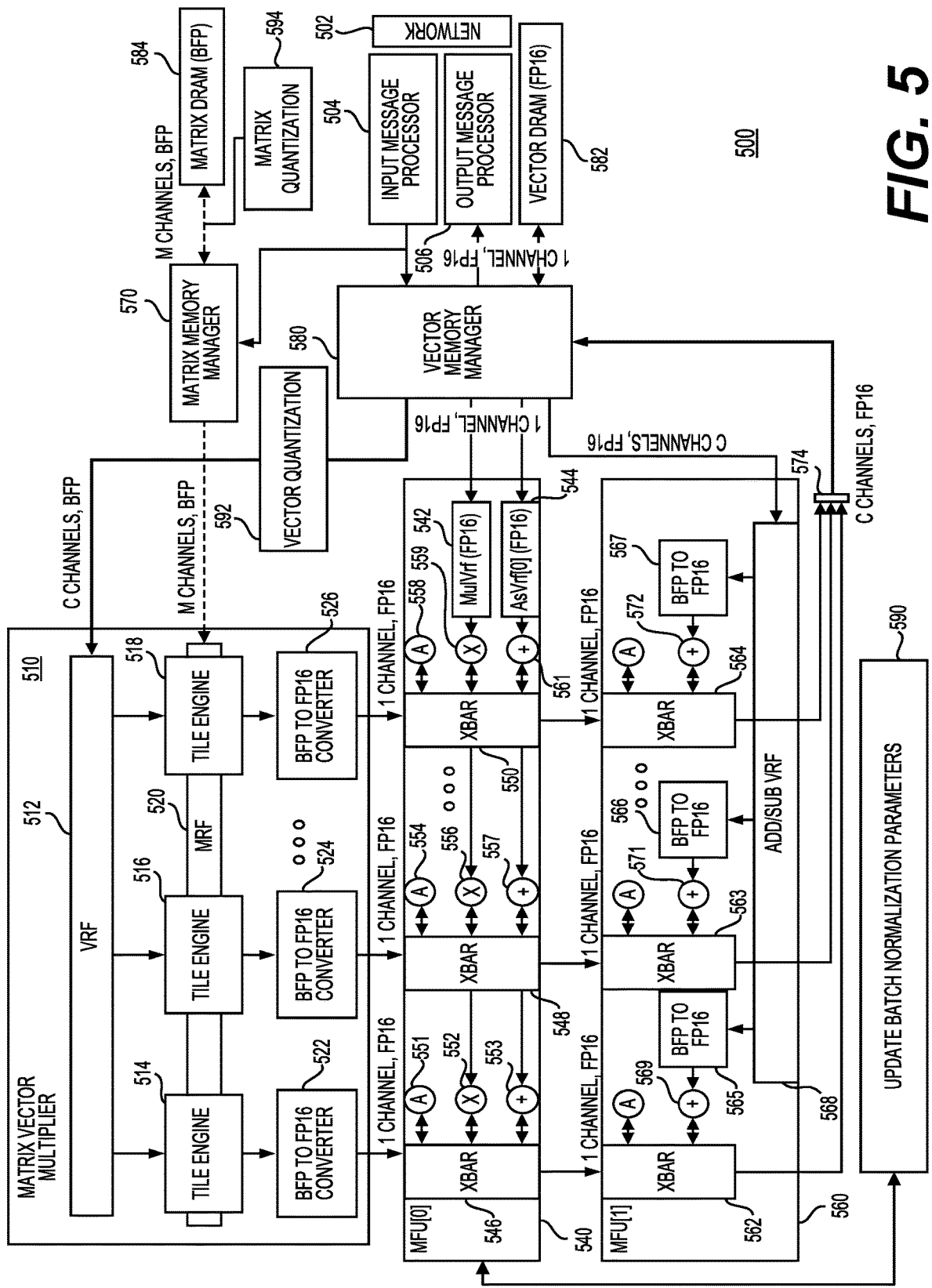
FIG. 5 is a block diagram of a neural network processor in which the network accuracy is improved through only updating the batch normalization parameters in accordance with one example.

FIG. 5 is a block diagram of a neural network processor 500 with in which the network accuracy is improved through only updating the batch normalization parameters in accordance with one example. Each neural network processor 500 may include an Input Message Processor (IMP) 504 for receiving messages from other processors and an Output Message Processor (OMP) 506 for processing outgoing messages to other processors or components. Such messages may be received and transmitted via network 502. Each neural network processor 500 may further include a matrix vector multiplier (MVM) 510 and two or more multifunction units (MFUs) (e.g., MFU[0] 540 and MFU[1] 560). Each neural network processor 500 may further include a matrix memory manager 570, a vector memory manager 580, a Vector DRAM 582, and a Matrix DRAM 584. In this example, the processor may accept off-chip messages containing auxiliary information such as control and scalar data and payload data (e.g., vectors, matrices, or other tensor data structures). In this example, the incoming messages may be handled by a lightweight input message processor (IMP) 504, which sends the vectors to vector memory manager 580. IMP 504 may send the matrices to matrix memory manager 570.

Each of vector data and matrix data may be quantized using vector quantization 592 and matrix quantization 594. Thus, vector data received from vector memory manager 580 may be in a higher precision format (e.g., FP16 or FP32) and vector quantization 592 may convert the vector data from the higher precision format to a lower precision format (e.g., block floating point format). Similarly, matrix data received via network 502 or otherwise may be in a higher precision format (e.g., FP16 or FP32) and matrix quantization 594 may convert the matrix data from the higher precision format to a lower precision format (e.g., block floating point format). Because the matrix multiplication operations are more expensive in terms of resources and time, in one example, it may be advantageous to quantize only the inputs to MVM 510. Thus, in the example shown in FIG. 5, only the inputs to MVM 510 are being quantized. The inputs to the MFUs are not being quantized. Alternatively, in another example, inputs to both MVM 510 and the MFUs may be quantized.

With continued reference to FIG. 5, each of the matrices may have an N by N size and each of the vectors may have a size of 1 by N. In this example, all instructions corresponding to neural network processor 500 may operate on native-sized data. Logical vectors and matrices corresponding to the applications handled by neural network processor 500 may often be larger than the native size; in these cases, the vectors and matrices are broken up into native-sized tiles. In one example, for matrix vector multiplication, matrix data and vector data may be expressed in block floating point (BFP) format. In this example, the block size of the BFP format data may be equal to the native dimension. Therefore, each native 1 by N vector may have a shared exponent, and each row of an N by N matrix may have a shared exponent. Each of the vector data and the matrix data may have a two's complement mantissa portion, and the mantissa size for the vector data and the matrix data may be different.

MVM 510 may include a vector register file (VRF) 512, a matrix register file (MRF) 520, and tile engines (e.g., tile engines 514, 516, and 518). Tile engines may receive input matrix and input vector data from VRF 512. MVM 510 may further include format converters, as needed, including block floating point (BFP) to floating point (FP) converters. In one example, two internal BFP formats may be used by MVM 510 for expressing its input and output: BFP short, for vector and matrix storage, and BFP long for accumulation. In one example of MVM 510, BFP short may use 81.15 fixed point values with a shared 5 bit exponent, and BFP long may use q34.40 fixed point values with a shared 5 bit exponent. In this example, the matrix-vector multiplication may result in BFP long, which may be converted back to a floating-point format as a final output stage. Thus, the example MVM 510 shown in FIG. 1 may include BFP to FP16 Converters 522, 524, and 526 at the output stages. Tile engines 514, 516, and 518 may, in parallel, provide outputs to the respective converters as shown in the example in FIG. 5.

The matrix data may be communicated between Matrix DRAM 584 and Matrix Memory manager 570 using M number of channels. Vector memory manager 580 may move vector data over C number of channels.

With continued reference to FIG. 5, each MFU (e.g., MFU[0] 540 and MFU[1] 560) may include crossbars (e.g., crossbars labeled as xbars). MFU[0] 540 may support vector operations, such as vector-vector multiply and addition, a Sigmoid function, a Tan H function, a softmax operation, a Rectified Linear Unit (ReLU) operation, and/or an activation block operation. Thus, as shown in FIG. 5, MFU[0] 540 may include crossbars (e.g., xbar 546, 548, and 550) that may stream a vector from its input bus through a pipelined sequence of operations. Thus, a vector may be received via a register file labeled MulVrf 542 or another register file labeled AsVrf[0] 544, and such vectors may be subjected to any of a multiply operation, an addition operation, or some other operation. MFU[0] 540 may include several hardware blocks for performing addition (e.g., 553, 557, and 561). MFU[0] 540 may also include several hardware blocks for performing multiplication (e.g., 552, 556, and 559). MFU[0] 540 may also include several hardware blocks for performing activation (e.g., 551, 554, and 558).

Still referring to FIG. 5, MFU[1] 560 may include crossbars (e.g., xbar 562, 563, and 564) that may allow MFU[1] 560 to receive outputs from MFU[0] 540 and perform additional operations on those outputs and any additional inputs received via ADD/SUB VRF 568. MFU[1] 560 may include several hardware blocks for performing addition (e.g., 569, 571, and 572). MFU[1] 560 may also include several hardware blocks for performing activation. The outputs from MFU[1] 560 received via C channels may be coupled via a multiplexing circuit 574 to vector memory manager 580.

With continued reference to FIG. 5, update batch normalization parameters (UBNP) 590 may be used to normalize mini-batch data and to update the batch normalization parameters as explained earlier with respect to FIG. 1 and FIG. 2. Thus, at least some of the functionality associated with BNT block 200 may be incorporated as hardware/firmware into UBNP 590. UBNP 590 may be coupled with MFU[0] 540. In this example, some of the functionality associated with BNT block 200 may be implemented using the hardware associated with MFU[0] 540 and some of the other functionality may be implemented as part of UBNP 590. Thus, the functionality associated with adder 242 of FIG. 2 may be handled by hardware block 553, 557, or 561 shown in FIG. 5 and the functionality associated with multiplier 244 may be handled by hardware blocks 552, 556, or 559 shown in FIG. 5. The running average ($\mu$) may be stored in AsVrf 544 and the running variance ($\sigma$) may be stored in MulVrf 542. The functionality associated with the remaining aspects of BNT block 200 may be implemented as part of UBNP 590. In other examples, the functionality of BNT block 200 may be implemented differently. Although not shown in FIG. 5, a combination of multiplexers and crossbars may be used to route data through UBNP 590 after processing of a layer such that the output of the layer may be processed. Although FIG. 5 shows a certain number of components of neural network processor 500 arranged in a certain manner, there could be more or fewer number of components arranged differently.

Neural network processor 500 may be used to enable issuance of instructions that can trigger millions of operations using a small number of instructions. As an example, Table 1 below shows instructions corresponding to a fully parameterized LSTM:

TABLE 1

```
void LSTM (int steps) {
    for (int t = 0; t < steps; t++) {
        v_rd (s , NeqQ, DONTCARE) ;
        v_wr (s , InitialVrf, 1stm → ivrf_xt) ;
        // xWF = xt * Wf + bf
        v_rd (s, InitialVrf , 1stm → ivrf_xt);
        mv_mul (s , 1stm → mrf_Wf) ;
        vv_add (s , 1stm → asvrf_bf) ;
        v_wr (s , AddSubVrf , 1stm → asvrf_xWf) ;
        // xWi = xt * Wi + bi ...
        // xWf = xt * Wo + bo ...
        // xWc = xt * Wc + bc ...
        // f gate → multiply by c_prev
        v_rd (s , InitialVrf , 1stm → ivrf_h_prev) ;
        mv_mul (s , 1stm → mrf_Uf) ;
        vv_add (s , 1stm → asvrf_xWf) ;
        v_sigm (s) ; // ft
        vv_mul (s , 1stm → mulvrf_c_prev) ;
        v_wr (s , AddSubVrf , 1stm → asvrf_ft_mod) ;
        // i gate ...
        // o gate ...
        // c gate → store ct and c_prev
        v_rd (s , InitialVrf , 1stm → ivrf_h_prev) ;
        mv_mul (s , 1stm → mrf_Uc) ;
        vv_add (s , 1stm → asvrf_xWc) ;
        v_tanh (s) ;
        vv_mul (s , 1stm → mulvrf_it) ;
        vv_add (s , 1stm → asvrf_ft_mod) ; // ct
        v_wr (s , MultiplyVrf , 1stm → mulvrf_c_prev) ;
        v_wr (s , InitialVrf, 1stm → ivrf_ct) ;
        // produce ht, store and send to network
        v_rd (s , InitialVrf , 1stm → ivrf_ct) ;
        v_tanh (s) ;
        vv_mul (s , 1stm → mulvrf_ot) ; // ht
        v_wr (s , InitialVrf , 1stm → ivrf_h_prev) ;
        v_wr (s , NetQ , DONTCARE) ;
    }
}
```

Although Table 1 shows a certain number of instructions having a certain format, neural network processor 500 may execute more or fewer instructions having a different format to accomplish the same objectives.

Table 2 below shows how to compute a 1×1 convolution as part of a CNN evaluation using neural network processor 500.

TABLE 2

```
SetIterations(bs, args->iterations);
SetRowsCols(bs, 1, args->cols);
// Compute
v_rd_inc(bs, ISA_Mem_MvmInitialVrf, mvuivrf_input, args->cols);
mv_mul(bs, mrf_weights);
vv_add_inc(bs, ISA_Mem_AddSubVrf_0, asvrf0_bias, 0);
vv_add_inc(bs, ISA_Mem_AddSubVrf_1, asvrf1_residual, 1);
v_relu(bs);
v_wr_inc(bs, ISA_Mem_NetOutputQ, DONTCARE, DONTCARE).
```

As shown in the table above, the number of iterations over a chain of instructions for the computation may be specified.

Next, as needed, the native dimension of each instruction chain may be scaled by a column scaling factor. And after reading the vector data from the vector register file it may be multiplied with the weights retrieved from the matrix register file. After performing additional operations as required by the CNN evaluation, the output may be provided. As an example, a pointwise Rectified Linear Unit (ReLU) operation may be performed for each element of the vector data.

Table 3 below shows an example of how to compute an N×N convolution as part of a CNN layer using neural network processor 500. The instructions below that are similar to the 1×1 convolution are not described again. The Set2dWindows instruction may be used to set the total window size and then SetIterations instruction may be used to slide that window across the input volume. The *_inc instructions (e.g., v_rd_inc and v_add_inc) may be used to increment the instruction's address based on the stride. As an example, a stride of 2 may result in the skipping of every other vector in the vector register file that is used to store vector data for operations, such as addition.

TABLE 3

```
SetRowsCols(bs, 1, args->windowCols * args->windowCols * args-
>volumeDepth);
Set2dWindow(bs, args->windowCols * args->volumeDepth, input_cols);
SetIterations(bs, output_cols);
for (unsigned imageRow = 0; imageRow < output_rows; imageRow++)
{
    for (unsigned filter = 0; filter < args->filterCount; filter++)
    {
        v_rd_inc(bs, ISA_Mem_MvmInitialVrf, ivrf_input + imageRow *
args->windowStride * input_cols, args->volumeDepth * args-
>windowStride);
        mv_mul(bs, mrf_weights + filter * args->windowCols * args-
>windowCols * args->volumeDepth);
        vv_add_inc(bs, ISA_Mem_AddSubVrf_0, asvrf0_bias + filter, 0);
        v_relu(bs);
        v_wr_inc(bs, ISA_Mem_Dram, dram_buffer_wr_ptr + filter,
output_depth);
    }
    dram_buffer_wr_ptr += output_cols * output_depth;
}
```

Table 4 below compares validation accuracy on the ImageNet dataset for ResNet-50.

TABLE 4

| Configuration | Top-1 Accuracy | Top-5 Accuracy |
|---|---|---|
| Floating-point | 74.956% | 92.096% |
| Quantized | 53.132% | 76.494% |
| Quantized with BNT | 72.07% | 90.294% |
| Quantized with SGD | 74.056% | 91.308% |

The accuracy of the following configurations is compared: the floating-point model, the quantized model using floating-point weights and parameters, the quantized model using floating-point weights but with batch norm parameters, and the quantized model using SGD fine-tuning. The quantized model is using block floating-point format for layers 1-49 with 4 bits for weights and 6 bits for activations. In this example, the training set was run through three times to update the moving mean and the moving variance as part of the batch normalization process described earlier. The SGD-based results were obtained after 30 epochs of fine-tuning. In sum, both the Quantized with SGD model and the Quantized with BNT model are using the mean and the standard deviation values updated for the quantized model. The Quantized with SGD model differs from the Quantized with BNT model in that the Quantized with SGD model uses stochastic gradient descent to update the layer weights and the batch normalization shift and scale parameters. In this example, the quantized configuration shows over 20% top-1 accuracy loss compared with the SGD-based configuration, while the quantized model with BNT configuration improves this to under 3% of accuracy loss compared with the SGD-based configuration. Thus, through the disclosed methods and technology, network accuracy may be improved through only updating the batch normalization means and standard deviation parameters, including in the context of quantized neural networks.

In conclusion, the present disclosure relates to a method implemented by a processor. The method may include receiving a subset of data corresponding to at least one layer of a neural network for processing using the processor. The method may further include during a forward propagation pass: (1) normalizing the subset of the data corresponding to the at least one layer of the neural network based on an average associated with the subset of the data and a variance associated with the subset of the data, where the normalizing the subset of the data comprises dynamically updating the average and dynamically updating the variance, to generate normalized data and (2) applying a transformation to the normalized data using a fixed scale parameter corresponding to the subset of the data and a fixed shift parameter corresponding to the subset of the data such that during the forward propagation pass neither the fixed scale parameter nor the fixed shift parameter is updated.

The subset of the data may comprise activation values corresponding to the at least one layer of the neural network. The subset of the data may comprise weight values corresponding to the at least one layer of the neural network. Each of the steps the normalizing the subset of the data and the applying the transformation may be performed to increase an accuracy of any inferences generated by the neural network model without requiring retraining of the neural network using gradient descent.

The subset of the data may be obtained by converting values corresponding to the subset of the data from a first precision format to a second precision format, wherein the second precision format has a lower precision than the first precision format. The first precision format may comprise floating point format. The second precision format may comprise a precision format selected from one of an integer format, a reduced floating point precision format, or a block floating point format.

In another example, the present disclosure relates to a processor configured to receive a subset of data corresponding to at least one layer of a neural network. The processor may further be configured to during a forward propagation pass: (1) normalize the subset of the data corresponding to the at least one layer of the neural network based on an average associated with the data and a variance associated with the data, wherein to normalize the subset of the data the processor is further configured to dynamically update the average and dynamically update the variance, to generate normalized data and (2) apply a transformation to the normalized data using a fixed scale parameter corresponding to the subset of the data and a fixed shift parameter corresponding to the subset of the data such that during the forward propagation pass neither the fixed scale parameter nor the fixed shift parameter is updated.

The subset of the data may comprise activation values corresponding to the at least one layer of the neural network. The subset of the data may comprise weight values corresponding to the at least one layer of the neural network.

The subset of the data may be obtained by converting values corresponding to the subset of the data from a first precision format to a second precision format, wherein the second precision format has a lower precision than the first precision format. The first precision format may comprise floating point format. The second precision format may comprise a precision format selected from one of an integer format, a reduced floating point precision format, or a block floating point format.

In yet another example, the present disclosure relates to a non-transitory computer-readable medium comprising instructions corresponding to a method implemented by a processor. The method may include receiving a subset of data corresponding to at least one layer of a neural network for processing using the processor. The method may further include during a forward propagation pass: (1) normalizing the subset of the data corresponding to the at least one layer of the neural network based on an average associated with the subset of the data and a variance associated with the subset of the data, where the normalizing the subset of the data comprises dynamically updating the average and dynamically updating the variance, to generate normalized data and (2) applying a transformation to the normalized data using a fixed scale parameter corresponding to the subset of the data and a fixed shift parameter corresponding to the subset of the data such that during the forward propagation pass neither the fixed scale parameter nor the fixed shift parameter is updated.

The subset of the data may comprise activation values corresponding to the at least one layer of the neural network. The subset of the data may comprise weight values corresponding to the at least one layer of the neural network. Each of the steps the normalizing the subset of the data and the applying the transformation may be performed to increase an accuracy of any inferences generated by the neural network model without requiring retraining of the neural network using gradient descent.

The subset of the data may be obtained by converting values corresponding to the subset of the data from a first precision format to a second precision format, wherein the second precision format has a lower precision than the first precision format. The first precision format may comprise floating point format. The second precision format may comprise a precision format selected from one of an integer format, a reduced floating point precision format, or a block floating point format.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method implemented by a processor, the method comprising:
   receiving a subset of data corresponding to at least one layer of a neural network for processing using the processor; and
   during a forward propagation pass: (1) normalizing the subset of the data corresponding to the at least one layer of the neural network based on an average associated with the subset of the data and a variance associated with the subset of the data, wherein the normalizing the subset of the data comprises dynamically updating the average and dynamically updating the variance, to generate normalized data and (2) applying a transformation to the normalized data using a fixed scale parameter corresponding to the subset of the data and a fixed shift parameter corresponding to the subset of the data such that during the forward propagation pass neither the fixed scale parameter nor the fixed shift parameter is updated, wherein the normalizing the subset of the data and the applying the transformation are repeated without updating the fixed scale parameter or the fixed shift parameter until the dynamically updated average settles in relation to a predetermined value of the average and the dynamically updated variance settles in relation to a predetermined value of the variance.

2. The method of claim 1, wherein the subset of the data comprises activation values corresponding to the at least one layer of the neural network.

3. The method of claim 1, wherein the subset of the data comprises weight values corresponding to the at least one layer of the neural network.

4. The method of claim 1, wherein each of steps of the normalizing the subset of the data and the applying the transformation is performed to increase an accuracy of any inferences generated by the neural network model without requiring retraining of the neural network using gradient descent.

5. The method of claim 1, wherein the subset of the data is obtained by converting values corresponding to the subset of the data from a first precision format to a second precision format, wherein the second precision format has a lower precision than the first precision format.

6. The method of claim 5, wherein the first precision format comprises floating point format.

7. The method of claim 5, wherein the second precision format comprises a precision format selected from one of an integer format, a reduced floating point precision format, or a block floating point format.

8. A processor configured to:
   receive a subset of data corresponding to at least one layer of a neural network; and
   during a forward propagation pass: (1) normalize the subset of the data corresponding to the at least one layer of the neural network based on an average associated with the data and a variance associated with the data, wherein to normalize the subset of the data the processor is further configured to dynamically update the average and dynamically update the variance, to generate normalized data and (2) apply a transformation to the normalized data using a fixed scale parameter corresponding to the subset of the data and a fixed shift parameter corresponding to the subset of the data such that during the forward propagation pass neither the fixed scale parameter nor the fixed shift parameter is updated, wherein the processor is further configured to normalize the subset of the data and to apply the transformation repeatedly without updating the fixed scale parameter or the fixed shift parameter until the dynamically updated average settles in relation to a predetermined value of the average and the dynamically updated variance settles in relation to a predetermined value of the variance.

9. The processor of claim 8, wherein the subset of the data comprises activation values corresponding to the at least one layer of the neural network.

10. The processor of claim 8, wherein the subset of the data comprises weight values corresponding to the at least one layer of the neural network.

11. The processor of claim 8, wherein the subset of the data is obtained by converting values corresponding to the subset of the data from a first precision format to a second precision format, wherein the second precision format has a lower precision than the first precision format.

12. The processor of claim 11, wherein the first precision format comprises floating point format.

13. The processor of claim 11, wherein the second precision format comprises a precision format selected from one of an integer format, a reduced floating point precision format, or a block floating point format.

14. A non-transitory computer-readable medium comprising instructions corresponding to a method implemented by a processor, the method comprising:
   receiving data corresponding to at least one layer of a neural network model for processing using the processor; and
   during forward propagation: (1) normalizing activations corresponding to the at least one layer of the neural network model based on an average associated with the data and a variance associated with the data to generate normalized data and (2) applying a transformation to the normalized data using a fixed scale parameter and a fixed shift parameter, wherein the applying the transformation to the normalized data includes, during the forward propagation, updating the average associated with the data and updating the variance associated with the data, but not updating each of the fixed scale parameter and the fixed shift parameter, and wherein the normalizing the activations and the applying the transformation are repeated without updating the fixed scale parameter or the fixed shift parameter until the updated average settles in relation to a predetermined value of the average and the updated variance settles in relation to a predetermined value of the variance.

15. The non-transitory computer-readable medium of claim 14, wherein the subset of the data comprises activation values corresponding to the at least one layer of the neural network.

16. The non-transitory computer-readable medium of claim 14, wherein the subset of the data comprises weight values corresponding to the at least one layer of the neural network.

17. The non-transitory computer-readable medium of claim 14, wherein each of steps of the normalizing the subset of the data and the applying the transformation is performed to increase an accuracy of any inferences generated by the neural network model without requiring retraining of the neural network using gradient descent.

18. The non-transitory computer-readable medium of claim 14, wherein the subset of the data is obtained by converting values corresponding to the subset of the data from a first precision format to a second precision format, wherein the second precision format has a lower precision than the first precision format.

19. The non-transitory computer-readable medium of claim 18, wherein the first precision format comprises floating point format.

20. The non-transitory computer-readable medium of claim 18, wherein the second precision format comprises a precision format selected from one of an integer format, a reduced floating point precision format, or a block floating point format.

* * * * *